United States Patent Office 3,333,937
Patented Aug. 1, 1967

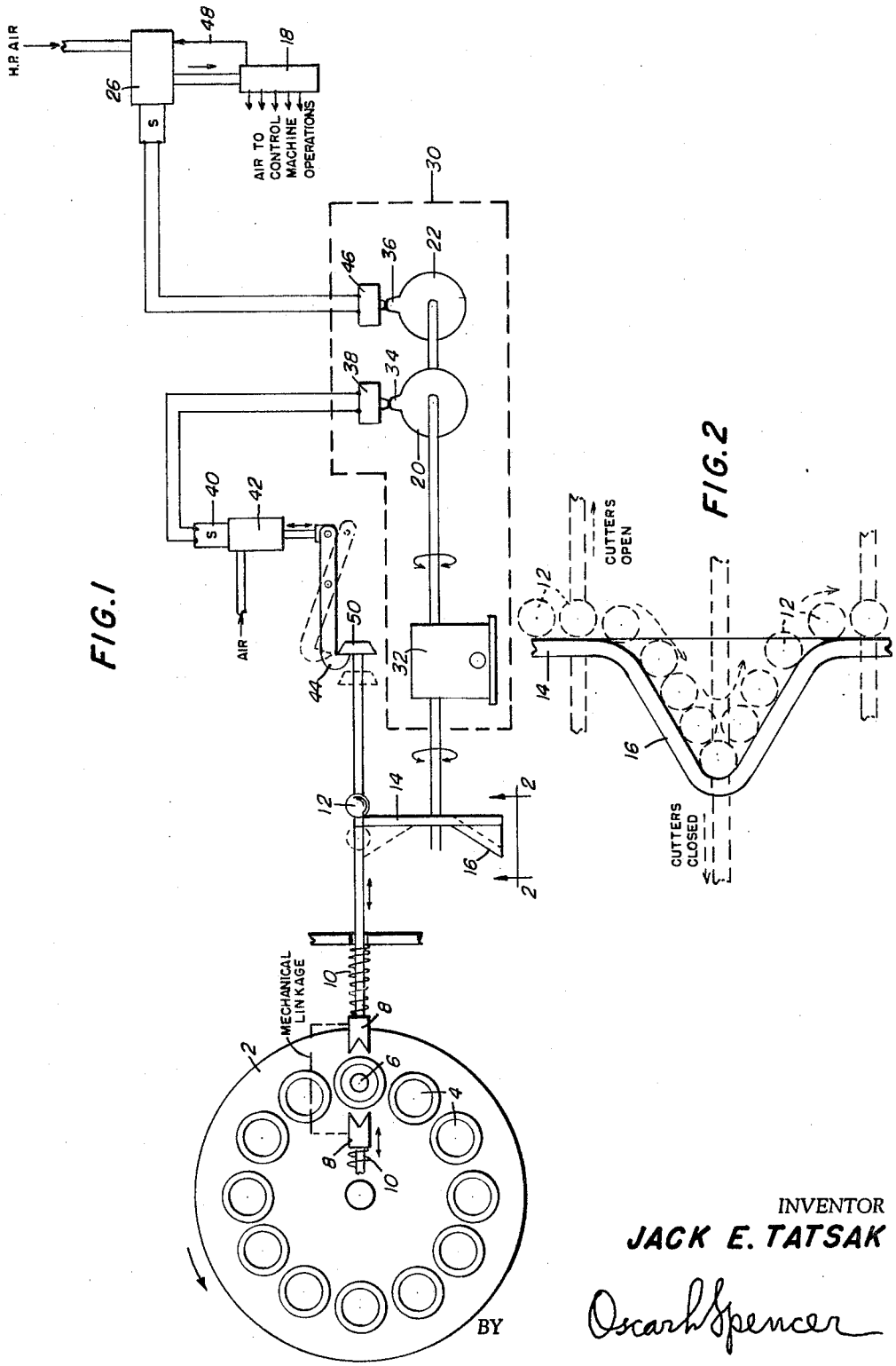

3,333,937
APPARATUS FOR MAINTAINING OPTIMUM SPEED OF CUTTING SHEARS WHEN GLASS GOB SIZES ARE VARIED
Jack E. Tatsak, Templeton, Pa., assignor to Pittsburgh Plate Glass Company, Pittsburgh, Pa., a corporation of Pennsylvania
Filed Dec. 26, 1963, Ser. No. 333,431
2 Claims. (Cl. 65—207)

This invention relates to glass forming machines, and more particularly to modifications to such machines that will permit them to operate at a lower rate of speed without extensive redesigning of the shearing structure.

The particular type of machine to which this invention pertains is that having a series of molds movable along a given path and stopped at various indexed positions where the glass charges within the molds are subjected to various mechanical forming operations. These machines conventionally have a container filled with molten glass located above the molds, and an orifice which drops the glass from the container into a mold. Beneath such an orifice, it is customary to provide a pair of coacting mechanical shears which cut the stream of glass before a mold therebelow is moved to its next indexed position.

Many of the operations of a machine of this type are controlled by a machine timer. This timer causes the movement of many of the various instrumentalities which act upon the glass in the molds, such as means for ejecting a glass article from a mold.

On occasions, it becomes desirable to slow down the machine; for example, when relatively large optical glass blanks are formed and the limited size of the orifice for the molten glass prolongs the time which a mold must remain beneath the orifice. Attempts to adjust the machine timer to accomplish a general slowdown have proven to be unsatisfactory, since the actions of the various elements which work on the glass are sometimes slowed down to a point at which they become ineffective.

It has been found that the mechanically operated shears have been especially ineffective when there is a general machine slowdown. These shears are not actuated by signals from the machine timer, but by mechanical means such as a cam which rotates in phase with the machine timer. A general slowdown prevents the shears from moving together with sufficient rapidity to cut the glass.

It is an object of this invention to provide a glass forming machine which is modified in a manner to provide for a machine slowdown without impairing the operating efficiency of any of the elements of the machine.

Another object is to provide a novel means for arresting the movement of mechanical shears and means for controlling such shear arresting means.

Another object is to provide a novel arrangement in a glass forming machine for coordinating the action of the machine timer and the action of other elements which act independently of the machine timer, but in a particular timed relationship thereto.

Stated in a brief form, the invention contemplates a glass forming machine movable in sequence to indexed positions where mechanical operations are performed on glass in the molds, a container having a glass dispensing orifice located above an indexed position, and cyclically actuated glass-cutting shears located beneath the orifice. The particular improvement to which this invention relates is the addition of means for mechanically arresting the movement of the shears, and means for releasing the arresting means after a predetermined number of cycles of the shear actuating means.

The invention may be understood more completely by referring to the following description and drawings, wherein:

FIG. 1 is a diagrammatic presentation of the interrelated elements of the invention; and FIG. 2 is a view taken along the line 2—2 in FIG. 1, showing a cam structure which may be used to actuate the shears.

In FIG. 1, a diagrammatic plan view of a rotatable table 2 is shown carrying a plurality of molds 4. This table is advanced intermittently so it stops in position where a mold is indexed beneath a molten glass dispensing orifice 6. This orifice is located in a container filled with molten glass.

A pair of shears 8 are located beneath the orifice and they may be mechanically connected to each other by means not shown, so that they will simultaneously move toward each other to sever a stream of glass flowing into the mold from the orifice. The shears 8 are biased toward their cutting position by means of springs 10; and they are held apart by a follower 12 on rotary cam 14 which opposes the biasing force of spring 10. The cam has a low spot 16 which during each cycle releases the follower 12 and permits the shears to move to their cutting position. The manner in which the follower moves with respect to the cam is illustrated in FIG. 2. The spring 10 and cam 14 comprise the means for actuating the shears.

The controlling of the machine is done, for the most part, by a machine timer 18, of a type well known in the art. This timer performs its function by receiving energy, usually in the form of high pressure air, and dispensing this energy according to a predetermined timed sequence to actuate valves which control the elements of the machine. For purposes of this description, one cycle of the machine timer is the period of time required for advancing a mold one indexed position and performing various operations at the indexed positions of the machine. Each cycle commences with the advancing of the molds.

It will become apparent from the above description that the timing of various elements such as the shear operating cam and the machine timer must be coordinated in a manner so that the cycle times of each are equal.

The amount of glass dispensed by the orifice is limited by the size of the orifice. Therefore, as stated above, when large lens blanks are made, it becomes necessary to slow down the overall operation of the machine so that the mold being filled remains beneath the glass dispensing orifice for a relatively long period of time. The obvious way to slow down the machine is to slow down the machine timer 18 and correspondingly reduce the speed of the shear actuating cam 14. This has proven unsatisfactory, as discussed above, since reducing the speed of the cam 14 also slows down the movement of the shears 8 toward each other, which greatly reduces their ability to cut a stream of glass.

A most satisfactory method of slowing down the machine has been to permit the cam 14 and timer 18 to continue without interruption at their normal operating speeds, and to provide additional means for disabling the shears 8 and the timer 18 for a certain number of cycles, permitting them to operate for one cycle and then again disabling the elements for the certain number of cycles.

The shears 8 are normally disabled by means of a pivoted hook 44 which latches over a tapered shoulder 50 which is connected to the shears. This hook is biased to the position shown in solid lines where it prevents the shears from moving, even when the cam 14 is in the position which otherwise closes the shears.

The shears are periodically freed from the hook 44 by means of an auxiliary timer 30. This auxiliary timer may be driven through a reduction gear 32 by the same shaft which rotates the shear cam 14. The resultant speed of the cams 20 and 22 in the auxiliary timer 30 is proportional in whole number proportions to the cycles of the cam 14 and the machine timer 18. For example, if it is desired to slow down the machine to 1/15 its normal speed, the cams 20 and 22 would rotate one time for each fifteen rotations of the cam 14 and for each fifteen cycles of the machine timer.

The cam 20 has a high spot 34 which is adapted to close a microswitch 38. The microswitch 38, when closed, opens a solenoid operated valve 40, permitting compressed air to move pneumatic cylinder 42 and lift the pivoted member 44. This releases the shears so that they will close when permitted to do so by the shear cam 14. Preferably, the switch closes and the hook 44 is raised when the cam 14 is approaching its shearing position where the follower 12 is aligned with the low spot 16 on the cam. So that the shears will close only one time while the hook is raised, the time period which the switch 38 is closed is preferably no greater than the cycle time of the cam 14.

The auxiliary timer 30 also has a cam 22 with a high spot 36 acting on a microswitch 46 which affects the machine timer.

The machine timer 18 is disabled by means of a normally closed solenoid operated valve 26 located in the line supplying air to the timer. As discussed above, compressed air energy is dispensed by the timer to control various elements of the machine. By stopping the air supply, the timer is rendered ineffective although it continues to rotate through its normal cycle.

The auxiliary timer 30, through its cam 22 and microswitch 46, opens the valve 26 at approximately the same time the hook 44 is lifted. This enables the machine timer 18 to follow a regular cycle during which it dispenses air to control the movement of the various machine elements. Any suitable type of feedback means, indicated diagrammatically at 48, is used to close the valve 26 at the end of one machine timer cycle.

The cams 20 and 22 may be adjusted so that the desired sequence of operations will result. Generally, the adjustment will provide for actuation of the shears slightly before the machine timer 18 starts its regular cycle during which it dispenses air.

It may be seen, from the above, that relatively minor modifications have been used to render a glass forming machine capable of operating at greatly reduced speeds, without major redesigning of the machine.

Various modifications to the above embodiment may be made within the scope of the invention as set forth in the following claims.

I claim:
1. In a glass forming machine,
a table having a plurality of molds mounted thereon,
a container having a glass stream feeding orifice disposed above said table,
means for moving said table step-wise to dispose said molds sequentially in an indexed position beneath said orifice to receive a gob of glass therein,
cyclically actuated glass cutting shears located beneath said orifice to shear a gob of glass from said stream of glass from said orifice,
means for maintaining a mold beneath said orifice for a dwell time until a gob of glass is deposited therein,
means for actuating said glass cutting shears at an optimum cutting speed,
the improvement for maintaining the optimum cutting speed of said shears after the deposition of said glass gob in said mold following a dwell time of the mold beneath the orifice which comprises,
means for selecting the time for maintaining said mold beneath said orifice so that a larger gob of glass is deposited therein,
means for arresting the operation of said glass cutting shears until said larger gob of glass is deposited in said mold, and
means for actuating said glass cutting shears at said optimum speed after said larger gob of glass is deposited in said mold.
2. In a glass forming machine as recited in claim 1, wherein said machine includes a main timer for initiating movement of said table and actuation of said shears, and an auxiliary timer for controlling the operation of said main timer and said shear arresting means.

References Cited

UNITED STATES PATENTS

| 1,331,847 | 2/1920 | Genest | 83—623 |
| 2,680,937 | 4/1949 | Peiler | 83—600 |
| 2,926,457 | 3/1960 | Trudeau | 65—223 |
| 2,977,718 | 4/1961 | Dahlman | 83—600 |

DONALL H. SYLVESTER, *Primary Examiner.*

G. R. MYERS, *Assistant Examiner.*